United States Patent [19]

Hayati et al.

[11] 4,204,872

[45] May 27, 1980

[54] PREPARATION OF HIGH TEMPERATURE SHELL MOLDS

[75] Inventors: Hossein Hayati; Russell S. Towers, both of Adrian, Mich.; Peter G. Carpenter, deceased, late of Westport, Conn.

[73] Assignee: Stauffer Chemical Company, Adrian, Mich.

[21] Appl. No.: 815,635

[22] Filed: Jul. 14, 1977 (Under 37 CFR 1.47)

Related U.S. Application Data

[63] Continuation-in-part of Ser. No. 719,776, Sep. 2, 1976, abandoned, which is a continuation of Ser. No. 489,867, Jul. 18, 1974, abandoned.

[51] Int. Cl.$^2$ ............................................. B28B 7/34
[52] U.S. Cl. ............................... 106/38.35; 106/38.3; 106/287.16
[58] Field of Search ............. 106/38.3, 38.35, 287 SE, 106/287.16

[56] References Cited

U.S. PATENT DOCUMENTS

| | | | |
|---|---|---|---|
| 3,112,538 | 12/1963 | Emblem | 106/38.35 |
| 3,392,036 | 7/1968 | McLeod | 106/38.35 |
| 3,653,930 | 4/1972 | Law et al. | 106/287 SE |
| 3,660,119 | 5/1972 | Oken | 106/1.17 |
| 3,910,797 | 10/1975 | Beers | 106/14.11 |

FOREIGN PATENT DOCUMENTS 163467 1/1954 Australia .

*Primary Examiner*—Lorenzo B. Hayes

[57] ABSTRACT

A binder composition and method for preparing shell molds which comprises coating a pattern with a binder composition substantially free of water containing a silicate ester, an aminoalcohol, an organic solvent and a refractory material, stuccoing and thereafter drying the coated pattern. The coating, stuccoing and drying sequence is repeated until the desired coating thickness is achieved and then a sealing coat is applied, if desired.

2 Claims, No Drawings

PREPARATION OF HIGH TEMPERATURE SHELL MOLDS

CROSS REFERENCE TO RELATED APPLICATIONS

This application is a continuation-in-part of application Ser. No. 719,776 filed Sept. 2, 1976, now abandoned, which was a continuation application of application Ser. No. 489,867 filed July 18, 1974 and now abandoned.

BACKGROUND OF THE INVENTION

This invention relates to a binder composition for shell molds, and more particularly to the preparation of shell molds for the casting of metals.

Precision casting of metal and other types of material in the molten state is used in many industries and, generally, such castings are made in expendable molds. There are three general types of processes for making the expendable molds and these may be classified as the "lost wax," the single investment and the double investment processes. These all have one thing in common; they are one-use molds in which the mold is generally destroyed in removing the casting therefrom. To provide an economical process, a master mold or pattern is initially prepared from which refractory molds are made by one of the above processes.

In the manufacture of precision castings by investment shell casting techniques, disposable patterns are made from waxes, plastics, frozen mercury and other materials which readily may be removed from the mold. The investment cycle consists of making the pattern by injecting the pattern material into the die and gating the pattern to a central sprue to form a pattern cluster.

Generally, the pattern cluster is dipped into an agitated slurry of the coating composition, drained, stuccoed while still wet with particulate mold material and dried. The dipping, draining, stuccoing and drying sequence is repeated the desired number of times, depending on the thickness and strength of the shell mold desired.

Thereafter, the disposable pattern is removed by methods such as melting or solvent treatment and the mold cured by firing at a temperature sufficient to remove the volatiles and provide adequate bonding. The molds are then heated and filled with molten metal and after cooling, the castings are removed from the sprue and finished in the usual manner.

The preparation of shell molds has been described in U.S. Pat. No. 3,270,382 to Emblem et al in which two different coatings are applied alternately to an expendable pattern. One coating consists of a gel-forming acid hydrolyzed alkyl silicate solution and the other coating consists of a gel-forming basic silicate ester. The acid hydrolyzed solution and the basic silicate ester of the applied coatings each act upon the other so as to cause gelation of the other.

U.S. Pat. No. 3,079,656 to Emblem et al, describes the preparation of aminosilicates by an interchange reaction between an isopropyl silicate and a mixture of aminoalcohols, while removing the alcohol produced as the result of the interchange reaction. The aminosilicates may be combined with a refractory material and applied to an expendable pattern. The coating is gelled by the addition of water. Likewise, aminoalkyl silicates have been disclosed as binders in U.S. Pat. No. 3,112,538 to Emblem et al. The binder is combined with fine refractory powders to form a slurry which is applied to a wax pattern. Each coating is allowed to partially harden before the next is applied. The coated pattern is then hardened for 24 hours before the wax pattern is removed.

Binders containing a mixture of an alkyl silicate and an aminoalkyl silicate have been described in U.S. Pat. No. 3,329,520 to Emblem et al. These binders are combined with a refractory material and water and then cast into the desired shape.

Emblem et al also disclose in U.S. Pat. No. 3,314,806 a binder composition containing an isopropyl silicate, water and a base as an accelerator for the hydrolysis and gelation of the silicate.

A paint composition containing a mixture of organic silicates and an amine having a pKa value above 7.8 is described in Australian Pat. No. 163,467. However, when the composition contains an amine such as monoethanolamine, the mixture must age for at least 48 hours and up to fourteen days before it can be used as a protective coating on sand cores.

The process of this invention constitutes an improvement in investment casting over that disclosed in the art. For example, the binder composition of this invention does not require an aging period, i.e, the composition is ready to use immediately after mixing the ingredients. Moreover, the resulting shell is ready for use after air drying for from one to three hours. Also, the binder composition of this invention has a better shelf-life and longer pot-life than similar aminosilicate compositions. In addition, the binder composition of this invention gels in the presence of atmospheric moisture and does not require adding additional water to the binder composition. Furthermore, the process of this invention utilizes a single binder composition to prepare shell molds, whereas many of the shell molds prepared heretofore required at least two different types of binder compositions.

Therefore, it is an object of this invention to provide a process for preparing shell molds. Another object of this invention is to provide a process for preparing shell molds which utilizes a single binder composition. Another object of this invention is to provide a process for preparing shell molds which may be used after air drying for from 1 to 3 hours. A further object of this invention is to provide a binder composition which does not require the addition of water to cause gelation thereof. A still further object of this invention is to provide a binder composition which does not require removing the alcohol resulting from the esterification of an organosilicate and an aminoalcohol.

DETAILED DESCRIPTION OF THE INVENTION

The foregoing objects and others which will become apparent from the following description are accomplished, generally speaking, by coating a previously cleaned and etched disposable pattern with a coating composition containing a refractory material and a binder which is substantially free of water, stuccoing with a coarse refractory material and then drying to set the coating material. The sequence of steps is repeated until the desired coating thickness is achieved. The coated pattern thus formed may be sealed with a seal coat or backup coating containing an acid hydrolyzed silicate ester, a solvent and a refractory material, if desired.

The binder composition of this invention is substantially free of water i.e., the composition contains less than 0.1 percent by weight of water based on the weight of the binder. Thus the composition contains a silicate ester, an aminoalcohol and an organic solvent, preferably a low boiling alcohol or polyether.

The silicate esters found to be useful in the present invention are the lower alkyl silicates such as methyl, ethyl, isopropyl and n-butyl silicates. Suitable examples of ethyl silicates are tetraethyl orthosilicate, "condensed" ethyl silicate and ethyl silicate "40". "Condensed" ethyl silicate is tetraethyl orthosilicate containing up to about 10 percent polyethylsilicates and is the undistilled reaction product of silicon tetrachloride, water and 200-proof ethanol. The resultant product contains from 2 to 5 percent ethanol, 90 to 95 percent orthosilicate and from 5 to 10 percent polyethoxy polysilicates. Ethyl silicate "40" is a mixture of polyethylsilicates averaging 5 silicon atoms per molecule having a silica content of about 40 percent. It is formed by reacting silicon tetrachloride with ethanol containing some water under conditions such that a silica content of about 40 percent is achieved. Other polymeric silicate esters which may be employed are those that are obtained from the hydrolysis and condensation of ethyl silicate "40".

Aminoalcohols which may be employed in the binder composition of this invention may be represented by the formula

where R is a divalent hydrocarbon radical having from 1 to 6 carbon atoms, R' is hydrogen or an alkyl group having from 1 to 6 carbon atoms or a group of the formula —ROH in which R is the same as above. Examples of suitable aminoalcohols are mono-, di-, or triethanolamine, monoisopropanolamine, 2-amino-butan-1-ol, 3-aminopropan-1-ol, 2-dimethylamino-2-methylpropan-1-ol and the like.

Any organic solvent which is miscible with the silicate ester and the aminoalcohol may be employed. It is preferred that the solvent have a boiling point below about 250° C. and more preferably below about 150° C. Examples of suitable organic solvents are aliphatic alcohols such as methanol, ethanol, isopropanol, butanol; ketones, such as acetone, methyl ethyl ketone and aromatic hydrocarbons such as benzene, toluene and the like. Polyethers which may be employed as solvents in the binder composition of this invention are glycol ethers such as monoalkylene glycol monoalkyl ethers, dialkylene glycol monoalkyl ethers, dialkylene glycol dialkyl ethers and monoalkylene glycol dialkyl ethers. Examples of preferred glycol ethers are ethylene glycol monomethyl ether, ethylene glycol monoethyl ether, ethylene glycol monobutyl ether, ethylene glycol dibutyl ether, ethylene glycol monohexyl ether, ethylene glycol monophenyl ether, and esters of the ethylene glycols such as ethylene glycol monobutyl ether acetate, ethylene glycol monomethyl ether acetate and the like.

The amount of aminoalcohol employed in the binder composition is not critical. It can be present in a mol ratio of aminoalcohol to alkyl silicate of from 1:1 to 10:1 and more preferably from about 3:1 to 8:1.

Generally the amount of silicate ester employed in the binder composition is sufficient to provide a binder having an $SiO_2$ content of about 10 to 35 percent and more preferably from about 15 to 30 percent by weight based on the weight of the binder composition.

Refractory materials which may be employed in the binder composition of this invention are many and varied. Generally, such well known refractories as the oxides and silicates of silicon, alumina, zirconium, zinc, magnesium, chromium and titanium may be used. These include the acidic minerals, the neutral or amphoteric minerals, especially those whose primary elements are found in Group II of the Periodic Table, the gel acid minerals, e.g., allophane and the basic minerals, e.g., zirkelite. Apart from the foregoing, zircon, grog, calcined clay, silica flour, sand and fused silica may be used in this invention. Examples of acidic, weakly acidic or neutral amphoteric minerals are fused silica, natural silica, zircon, zirconite, which is a mixture of silicates and oxides of zircon; mullite which is a high refractory aluminum silicate, clays, magnesia, and other metal oxides and silicates.

These refractory materials may be employed alone or in combination depending on the particular casting operation contemplated. Also, the particle size of the refractory material employed depends on the specific purpose for which the mold is being fabricated. In some cases, it is desirable to employ a mixture containing both relatively coarse and fine particles. Generally, a coarser refractory material is used in the stuccoing step than is used in the initial coating compositions thereby providing a bond between one shell coat and the successive coat.

A shell mold conforming to the invention is produced without the use of any other binder than the one described in this invention. However, where a seal coat or backup coat having increased hardness is desired, then a binder composition containing a refractory material and silicate esters such as the prehydrolyzed type commerically available or those prepared by the acid hydrolysis of any of the commercially available forms of ethyl silicate, including monomeric orthosilicate, "condensed" ethyl silicate or ethyl silicate "40" may be employed.

To prevent premature gelation of the backup or seal coat composition, a small quantity of acid having an acidity greater than that of the hydrolyzed ethyl silicate or an acidic buffering agent can be added to the binder solution. The pH of the seal coat composition should be maintained in the range from about 1 to 3.2. Suitable acids and buffering agents include hydrochloric acid, phosphoric acid, sulfuric acid, and ammonium nitrate. The quantity of acid or buffering agent employed will vary depending upon the acid or buffering agent used and the refractory material present in the composition.

The same refractory materials which were employed in the prior coating composition may be used in the seal or backup coat. Generally, these refractory materials are oxides and silicates of silicon, alumina, zirconium, zinc, tin, magnesium, chromium, titanium and the like. Other refractory materials such as grog, calcined clay silica flour, sand or fused silica may also be used in the seal coat composition.

These refractory materials may be employed in any combination deemed desirable depending on the particular casting operation contemplated.

The same solvents which were used in the precoating composition described above may be used in the seal coat. Examples of suitable solvents are the alcohols, ketones and polyethers such as the monoalkylene glycols monoalkyl ethers, dialkylene glycols monoalkyl ethers, monoalkylene glycols dialkyl ethers and dialkylene glycols dialkyl ethers.

The amount of binder employed in the coating composition is substantially determined by the particle size of the refractory materials since the finer the refractory material the more readily it absorbs the binder, hence the more binder required. In some cases where the refractory particles are coarse, the amount of binder required may be such that for every 50 parts of refractory material there may be used only that amount of binder necessary to provide 1 part of binder $SiO_2$. Conversely, where the particles of refractory material are extremely fine it may be necessary to use with each 4 parts of refractory material that amount of binder necessary to provide 1 part of binder $SiO_2$. In other words, the ratio of refractory material to binder may range from about 4 to 50 parts refractory material per part of binder $SiO_2$.

In general, the seal coat composition is applied to the previously dried precoat and then dried in the presence of atmospheric moisture. In the event it is desired to accelerate the gelling of the seal coat, then a basic material such as ammonia or organic amines such as aliphatic, aromatic and cyclic amines having up to 10 carbon atoms may be employed. Examples of suitable amines are methylamine, mono-, di- and triethylamines, propylamine, n-butylamine, cyclohexylamine, hydrazine, piperidine, and the like.

After the pattern has been covered with the desired number of coats it is dried at a temperature which may vary from about 25° C. up to, but does not exceed the softening temperature of the disposable pattern. The temperature may then be increased to fluidize and remove the disposable pattern therefrom. The resulting shell mold is subsequently fired by exposure to a temperature of from about 500° to 3000° C. in an oxidizing atmosphere for from about 1 to 12 hours.

Various aspects of the invention are illustrated by the following examples in which all parts are by weight unless otherwise specified.

EXAMPLE 1

(a) A binder composition is prepared by adding with agitation 374 parts of monoethanolamine to a solution containing 750 parts of ethyl silicate "40" and 876 parts of ethanol at a temperature of from 40° to 45° C. After stirring for about one hour at this temperature, the composition is cooled to 30° C., filtered and stored in an air tight container. The shelf-life of the resultant binder composition is 6 months.

(b) A coating composition is prepared by mixing 2560 parts of zircon (325 mesh) and 640 parts of fused silica (Rancosil #1, 200 mesh) with 800 parts of the binder prepared in (a) above to form a slurry having a viscosity of about 10.5 seconds (Zahn Cup No. 4). The pot-life of the binder of the resultant coating composition is 6 days.

EXAMPLE 2

(a) In a comparison example, a binder composition is prepared in accordance with the procedure described in Example 1(a) except that 20 parts of water are added. The shelf-life of the resultant binder composition is 30 minutes.

(b) A coating composition is prepared in accordance with Example 1(b) except that the binder of Example 2(a) is substituted for the binder of Example 1(a). The pot-life of the resultant coating composition is 30 minutes.

EXAMPLE 3

A wax tree pattern is sprued and gated to conform to the requirements of the metal cast and casting desired. The tree is momentarily etched in a 75 percent trichloroethylene-25 percent isopropyl alcohol mixture and the excess removed with isopropyl alcohol. The pattern is allowed to dry before dipping into a coating composition prepared in the following manner.

| Binder Composition | |
|---|---|
| Ingredients | Parts |
| Ethyl silicate (condensed) | 416 |
| Ethanol | 540 |
| Ethanolamine | 244 |

The binder composition is prepared by adding with agitation ethanolamine to a solution containing "condensed" ethyl silicate and ethanol at a temperature of from 40° to 45° C. The solution is stirred for one hour at this temperature, cooled to about 30° C. and filtered.

Approximately 300 parts of the binder composition prepared above is mixed with about 200 parts of zircon (325 mesh) and 400 parts of fused silica (available from Ransom and Randolph Company as Rancosil #1) to form a slurry. The wax pattern is coated with the slurry, stuccoed with a fused silica sand (available from Ransom & Randolph Company as Rancosil A) and air dried for 15 minutes. The sequence of dipping and stuccoing is repeated two times. The precoated pattern is then dipped into a composition containing 300 parts of the above binder composition, 100 parts of zircon (200 mesh) and 300 parts of fused silica (Rancosil #2), stuccoed with a fused silica sand (Rancosil B), and air dried for 15 minutes. The sequence of dipping and stuccoing is repeated four times. The final coat is dried for from 1 to 3 hours, dewaxed at a temperature of 200° C. and then fired at a temperature of about 1000° C. A shell mold free of imperfections is obtained.

EXAMPLE 4

The procedure of Example 3 is repeated except that 122 parts of ethanolamine is employed in the preparation of the binder composition. A shell mold having considerable strength and free of imperfections is obtained.

EXAMPLE 5

The procedure of Example 3 is repeated except that 416 parts of ethyl silicate "40" is substituted for the "condensed" ethyl silicate. Again a suitable shell mold free of imperfections is obtained.

EXAMPLE 6

The procedure of Example 3 is repeated except that ethylene glycol monoethyl ether is substituted for ethanol. A shell mold having the desired strength is obtained.

EXAMPLE 7

A shell mold is prepared in accordance with the procedure of Example 3 except that the precoated pattern is coated with a backup coat consisting of the following ingredients.

| Ingredients | Parts by weight |
| --- | --- |
| water | 0.5 |
| Silbond H-4 (a partially hydrolyzed silicate binder available from Stauffer Chemical Company) | 24.0 |
| isopropyl alcohol | 24.0 |
| fused silica flour (fine grain Nalcast P1W available from Nalco Chemical Company) | 148.0 |

Water is added to the Silbond H-4 and the mixture allowed to stand overnight before the alcohol and fused silica flour are added. Approximately 1 to 3 milliliters of sulfuric acid is added to each gallon of the backup coat slurry to neutralize the basic ingredients.

The precoated pattern of Example 3 is dipped into the slurry described above, excess slurry is removed and then stuccoed with a coarse fused silica flour (Nalcast S-2). The dipping and stuccoing sequence is repeated four times. The coated pattern is then dried overnight and the wax removed by means of a high pressure steam autoclave. The resulting shell is fired at a temperature of about 1000° C. and while still hot, molten steel is poured into the cast. The cast is then cooled and the shell is broken off by vibration. The casting showed no appreciable scaling or imperfections of any kind.

Other additives which may be incorporated in the binder composition of this invention are alkyl borates in which each of the alkyl groups contains from 1 to 8 carbon atoms. The term "borate" includes any alkanol ester of boric acid. Suitable examples of alkyl borates are trimethyl borate, triethyl borate, tripropyl borate, and triisobutyl borate. Other boron compounds which may be employed are the boroxines, such as trimethoxyboroxine, tri-n-butoxyboroxine, trihexoxyboroxine and the like. The borate or boroxine can be added in pure form or in solvent solution as desired.

The amount of alkyl borate or boroxine that may be added to the binder composition ranges from about 0.5 to 10 percent and preferably from about 1 to 5 percent by weight based on the weight of the binder composition.

The addition of the alkyl borate or boroxine improves the stability of the binder composition, i.e., it improves the shelf-life and the pot-life of the resulting coating composition.

The invention is not to be limited solely to the examples described above, but is to include all the variations and modifications falling within the spirit and scope of the appended claims.

What is claimed is:

1. A process for preparing a shell mold which comprises coating an expendable pattern with a composition containing a binder which is substantially free of water and a refractory material in which the ratio of refractory material to binder is from about 4 to 50 parts of refractory material per part of binder $SiO_2$, said binder consisting essentially of a prehydrolyzed alkyl orthosilicate in which the alkyl group has from 1 to 4 carbon atoms, an aminoalcohol of the formula $$HORN(R')_2$$

in which R is a divalent hydrocarbon radical having from 1 to 6 carbon atoms, R' is selected from the group consisting of hydrogen, an alkyl radical and a radical of the formula —ROH in which R is the same as above, in which the mol ratio of aminoalcohol to alkyl orthosilicate is from 1:1 to 10:1 and sufficient organic solvent to provide an $SiO_2$ content of from 10 to 35 percent by weight based on the weight of the binder, stuccoing the coated pattern, air drying and repeating the above sequence of steps until a coating of desired thickness is achieved.

2. The process of claim 1 wherein the coating composition contains from 0.5 to 10 percent by weight based on the weight of the binder composition of an alkyl borate.

* * * * *